Nov. 3, 1925.

H. PRINCE 1,560,316

CABLE SPLICE

Filed April 3, 1924

Inventor.
Harry Prince.
by Popp and Powers.
Attys

Patented Nov. 3, 1925.

1,560,316

UNITED STATES PATENT OFFICE.

HARRY PRINCE, OF BUFFALO, NEW YORK.

CABLE SPLICE.

Application filed April 3, 1924. Serial No. 704,033.

*To all whom it may concern:*

Be it known that I, HARRY PRINCE, a subject of the King of Great Britain, residing at Buffalo, in the county of Erie and State of New York, have invented a new and useful Improvement in Cable Splices, of which the following is a specification.

This invention relates to improvements in cable splices.

The principal object is to provide a cable splice of exceedingly simple and economical construction which is adaptable to cables of different diameters and which is effectively engaged with and secured to the cable ends which it connects.

With the above objects in view the invention consists generally in a cable splice in the form of a longitudinally corrugated sheet metal sleeve or tube which, as fitted upon the cable ends to be connected, is caused to securely grip the same consequent to a deformation of the corrugations, these preferably being so formed that they may be overlaid, one on the other, thereby to change the cross section of the sleeve into that of a circle whose diameter depends on and conforms to the diameter of the adjacent cable ends.

An embodiment of the invention is illustrated in the accompanying drawing, wherein:—

Figure 1:
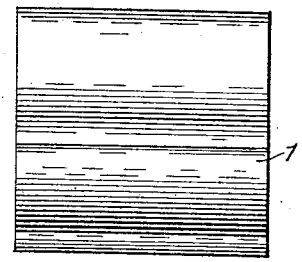
Figure 1 is a side elevation of the cable splice prior to its deformation.
Figure 2:
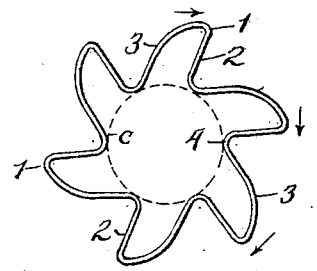
Figure 2 is an end view thereof.
Figure 3:
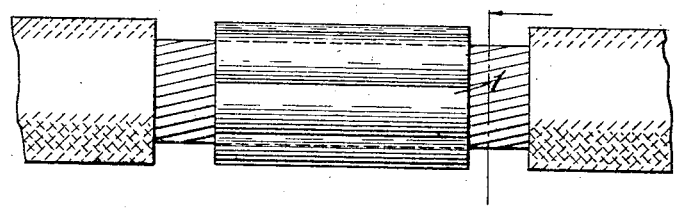
Figure 3 is a side elevation showing the splice in operative relation.
Figure 4:
Figures 4, 5 and 6 are cross sections of the same illustrating, comparatively, the adaptability of the splice to cables of different diameters within a prescribed range of sizes.
Figure 5:
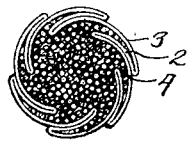
Figure 6:
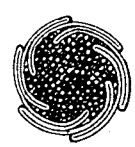

As shown in Figures 1 and 2 the splice is originally in the form of a tube or sleeve which is suitably rolled to provide longitudinal corrugations 1, these being preferably of such cross sectional outline that they may be readily bent inward in corresponding directions whereby they will be overlaid one on the other. Preferably each corrugation has a radially disposed wall 2 and a wall 3 extending at an angle to the radially disposed wall, the resultant original cross section of the splice somewhat resembling that of a ratchet wheel. As shown the corrugations are bent laterally inward in a direction taken generally from the wall 3 to the wall 2 of each corrugation as indicated by the arrows in Figure 2. The radial wall of each corrugation forms with the angular wall 3 of the corrugation next in advance an inner longitudinal apex 4, these apices being arranged equidistantly along an imaginary circle $c$ shown by a broken line in Figure 2. Considering the diameter of this circle as the original diameter of the splice it will be noted that when the splice is fitted upon the cable ends and the corrugations are bent inward on one another the splice is deformed into a mean circular cross section of reduced diameter.

The original diameter of the splice is in any case sufficiently greater than that of the cables to be connected to permit the ends of the cables to be readily passed into the opposite ends of the splice and interlaced with one another in the usual manner. This having been done, one or more blows is given by means of a suitable instrument successively to each corrugation in such manner that the radial walls 2 are driven inward until the apices 4 engage the enclosed cable ends. The blows upon the corrugations are then continued with the result of bending the corrugations inward in the direction of bending for which they are shaped or designed and the cycle of such blows is repeated until the required deformation of the splice has been produced. By proceeding in this manner the apices 4 are shifted to points along a circle of reduced diameter conforming to the diameter of the cable ends and the wall 3 of each corrugation is laid on the wall 2 and the wall 2 is laid on the wall 3 of the corrugation next in advance. The walls 2 and 3 as bent inward are thus bent relatively to the apices 4 as axes and, lying shingle-wise on one another, result in the splice as an entirety assuming a general or mean circular outline of smaller diameter than that of the circle along which the apices 4 were originally arranged. The inner face of the splice thus becomes substantially continuously circumferential, that is to say the gaps originally provided between the walls 2 and 3 and manifest in Figure 2 are closed and the apices 4 are presented as a series of internal shoulders extending from such inner circumferential face.

The ends of the cable are stripped of their sheathing whereby the strands are exposed. As the splice is contracted upon the cable ends in the manner above explained it is caused to have a secure grip upon the same, which grip is aided by reason of the fact that certain of the strands of the outer layer will be separately gripped between the overlying walls 2 and 3.

The drawing shows the splice as adaptable to three different sizes of cables, which sizes may be assumed to be standard. It will, of course, be understood that the range of sizes may be varied within practical limits and that the splices may be furnished in varying sizes, each size being adaptable to a particular range of cable sizes.

Having fully described my invention, I claim:—

1. A cable splice comprising a tube or sleeve formed with longitudinal corrugations and adapted by a series of blows applied to said corrugations to be deformed into mean circular outline whereby the corrugations are laid shingle-wise on one another.

2. A cable splice comprising a tube or sleeve formed with longitudinal corrugations, each having a radially disposed wall and a wall extending at an angle thereto, the splice being adapted by a series of blows applied to said corrugations to be deformed into mean circular outline whereby the corrugations are laid shingle-wise on one another.

In testimony whereof I affix my signature.

HARRY PRINCE.